US006907318B2

(12) United States Patent
Passmore et al.

(10) Patent No.: US 6,907,318 B2
(45) Date of Patent: Jun. 14, 2005

(54) MULTI-STATION ROBOTIC WELDING ASSEMBLY

(75) Inventors: Michael L. Passmore, Statesville, NC (US); Douglas E. Smyth, Olin, NC (US)

(73) Assignee: Advanced Tubing Technology, Inc., Statesville, NC (US)

( * ) Notice: Subject to any disclaimer, the term of this patent is extended or adjusted under 35 U.S.C. 154(b) by 147 days.

(21) Appl. No.: 10/339,081

(22) Filed: Jan. 9, 2003

(65) Prior Publication Data

US 2004/0138782 A1 Jul. 15, 2004

(51) Int. Cl.$^7$ ............................................. G06F 19/00
(52) U.S. Cl. ..................... 700/245; 700/247; 700/248; 700/258; 700/261; 700/264; 318/41; 318/42; 318/568.19; 318/668; 219/110; 701/23; 74/490.01
(58) Field of Search .................... 700/245, 247–249, 700/258, 261, 264; 318/41, 42, 568.19, 668; 219/110; 701/23; 74/490.01

(56) References Cited

U.S. PATENT DOCUMENTS

| | | | | |
|---|---|---|---|---|
| 4,757,180 A | * | 7/1988 | Kainz et al. | 219/137.3 |
| 5,321,225 A | * | 6/1994 | Boyer | 219/89 |
| 5,486,679 A | | 1/1996 | Hamura et al. | |
| 6,021,361 A | * | 2/2000 | Taninaga et al. | 700/182 |
| 6,177,650 B1 | | 1/2001 | Watanabe et al. | |
| 6,230,077 B1 | * | 5/2001 | Choi | 700/245 |
| 6,243,621 B1 | * | 6/2001 | Tao et al. | 700/245 |
| 6,340,875 B1 | | 1/2002 | Watanabe et al. | |
| 6,356,807 B1 | * | 3/2002 | McGee et al. | 700/253 |
| 6,365,221 B1 | * | 4/2002 | Morton | 427/140 |
| 6,615,112 B1 | * | 9/2003 | Roos | 700/254 |
| 6,651,867 B2 | * | 11/2003 | Angel | 228/49.1 |
| 6,662,083 B2 | * | 12/2003 | Angel | 700/248 |
| 6,757,586 B2 | * | 6/2004 | Milojevic et al. | 700/245 |
| 2003/0057256 A1 | * | 3/2003 | Nakamura et al. | 228/49.1 |
| 2003/0164200 A1 | * | 9/2003 | Czeranna et al. | 141/1 |

FOREIGN PATENT DOCUMENTS

| | | | |
|---|---|---|---|
| DE | 19713860 | * | 9/1998 |
| FR | 2773092 | * | 12/1997 |
| JP | 01-249542 | * | 9/1998 |
| JP | 10-249764 | * | 9/1998 |

OTHER PUBLICATIONS

Montegi et al., Sensor–enhanced robotic cell collaboration using shared task error information, 1998 IEEE, vol. 3, May 16–20, 1998, Page(s): 2375–2382 vol. 3.*
FANUC Robotics, ARC Mate 100iB, website pages, 4 pages, 2002, FANUC Robotics North America, USA.
CAMCO Indexer FAQ, Frequently Asked Questions, website pages, 4 pages, 2003, CAMCO Indexer, USA.
Tough Gun. Tough Gun Robotic Air–Cooled Mig Gun, website pages, 1 page, 2003, Tough Gun X, USA.

* cited by examiner

Primary Examiner—Thomas G. Black
Assistant Examiner—McDieunel Marc
(74) Attorney, Agent, or Firm—Adams Evans P.A.

(57) ABSTRACT

A multi-station robotic welding assembly includes a mounting platform, and a plurality of robots attached to the mounting platform and located in respective weld stations. Each of the robots includes an elongated movable arm and wrist. A welding torch is attached to each of the robots, and is adapted for being manipulated by the movable arm and wrist. A rotatable fixture base is located on the mounting platform, and is adapted for supporting a plurality of fixtures. Each of the fixtures is adapted for holding and positioning a workpiece for welding in respective weld stations. A base indexer is adapted for repeatedly rotating the fixture base by a predetermined degree, such that the fixtures are positioned within respective weld stations for an index interval sufficient to complete welding of the workpieces.

16 Claims, 8 Drawing Sheets

MULTI-STATION ROBOTIC WELDING ASSEMBLY

TECHNICAL FIELD AND BACKGROUND OF INVENTION

This application relates to a multi-station robotic welding assembly. The invention utilizes two or more industrial robots each including a welding torch at a distal end of a movable arm and wrist. Welding is carried out by moving the welding torch along a taught path relative to a workpiece. When a welding operation is started, a preset welding voltage and current are commanded from a robot control device to a controller of a welding machine. On receiving the command, the welding machine supplies electric power between the workpiece and an electrode of the welding torch. When an arc discharge is generated between the workpiece and the electrode, it is detected by the controller of the welding machine, which then supplies an arc generation signal to the robot control device. On receiving the arc generation signal, the robot control device commands welding voltage and current for normal welding to the controller of the welding machine, and at the same time, actuates the robot arm to move the welding torch along the taught path.

In a typical weld cell, a single industrial robot is used to weld all or part of a workpiece held in a fixture. The workpiece may include, for example, disassembled parts for bumpers, foot plates, headlight supports, arm rests, and other components commonly used in all-terrain vehicles (ATVs) and golf carts. The workpiece is first loaded into the fixture by an operator, who then waits as the welding process is completed. After welding, the assembled workpiece is removed from the fixture and generally powder coated before shipping to the customer. The cumulative operator "down time" during the welding process over a given shift is substantial, and results in a relatively inefficient process. The present invention addresses this problem. The invention further provides a multi-station robotic weld cell which can be quickly and conveniently relocated as a single unit without substantial disassembly or breaking down of parts.

SUMMARY OF INVENTION

Therefore, it is an object of the invention to provide a multi-station robotic welding assembly which offers increased production efficiency without increased labor cost.

It is another object of the invention to provide a multi-station robotic welding assembly which requires less floor space than comparable equipment operating at the same production rate.

It is another object of the invention to provide a multi-station robotic welding assembly which can be conveniently relocated without substantially disassembly or breaking down of parts.

It is another object of the invention to provide a multi-station robotic welding assembly which utilizes two weld robots which do not interfere with each other during welding.

It is another object of the invention to provide a multi-station robotic welding assembly which utilizes an electrical D-ring connector.

It is another object of the invention to provide a multi-station robotic welding assembly which utilizes two or more robots with only one weld fixture per robot, and one weld fixture at an operator station.

It is another object of the invention to provide a multi-station robotic welding assembly which requires less tooling and tooling costs as compared to standard multi-robot weld cells. In standard cells, two fixtures are generally serviced by a single robot.

It is another object of the invention to provide a multi-station robotic welding assembly including multiple robots which operate in separate and distinct work envelopes which do not cross each other. In standard two-robot systems, the work envelopes cross thus causing longer programming time. The crossing envelopes further increase the risk of the robots crashing into each other as a result of misprogramming.

It is another object of the invention to provide a method for welding a workpiece.

These and other objects of the present invention are achieved in the preferred embodiments disclosed below by providing a multi-station robotic welding assembly. The assembly includes a mounting platform, and a plurality of robots attached to the mounting platform and located in respective weld stations. Each of the robots includes an elongated movable arm and wrist. A welding torch is attached to each of the robots, and is adapted for being manipulated by the movable arm and wrist. A rotatable fixture base is located on the mounting platform, and is adapted for supporting a plurality of fixtures. Each of the fixtures is adapted for holding and positioning a workpiece for welding in respective weld stations. A base indexer is adapted for repeatedly rotating the fixture base by a predetermined degree, such that the fixtures are positioned within respective weld stations for an index interval sufficient to complete welding of the workpieces.

According to another preferred embodiment of the invention, the fixture base includes a plurality of fixture indexers adapted for carrying respective fixtures. The fixture indexers repeatedly rotate the fixtures and attached workpieces in respective weld stations by a predetermined degree during welding.

According to another preferred embodiment of the invention, each fixture indexer has eight discrete positions.

According to another preferred embodiment of the invention, the fixture indexers are spaced 120 degrees apart.

According to another preferred embodiment of the invention, a station shield is located between each of the weld stations for shielding and protecting a surrounding area during welding.

According to another preferred embodiment of the invention, the fixture base includes a junction box which connects all indexers and houses an electrical D-ring, or slip ring. Unlike conventional indexers which rotate clockwise and counterclockwise in a 180-degree path, the present D-ring allows continuous 360-degree rotation of the base indexer, thereby avoiding winding and breakage of cables inside the junction box.

According to another preferred embodiment of the invention, the plurality of industrial robots includes two robots located in respective first and second weld stations.

According to another preferred embodiment of the invention, an operator station is located between the first and second weld stations for loading and unloading the workpieces.

In another embodiment, the invention is a method for welding a workpiece. The method includes the step of loading a first workpiece into a first fixture located in an operator's station. The first fixture is indexed to locate the first workpiece in a first weld station. A first portion of the first workpiece is welded in the first weld station. During welding of the first portion of the first workpiece, a second workpiece is simultaneously loaded into a second fixture located in the operator's station. The first and second fixtures are indexed to locate the first and second workpieces in respective second and first weld stations. A first portion of the second workpiece is welded in the first weld station while simultaneously welding a second portion of the first workpiece in the second weld station. During this welding process, a third workpiece is simultaneously loaded into a third fixture located in the operator's station. The first, second, and third fixtures are indexed to locate the first, second, and third workpieces in the operator's station, the second weld station, and the first weld station, respectively. A first portion of the third workpiece is welded in the first weld station while simultaneously welding a second portion of the second workpiece in the second weld station. During this welding process, the first workpiece is simultaneously removed from the first fixture in the operator's station, reloaded, and the cycle continues in a 360 degree rotation.

BRIEF DESCRIPTION OF THE DRAWINGS

Some of the objects of the invention have been set forth above. Other objects and advantages of the invention will appear as the description proceeds when taken in conjunction with the following drawings, in which.

DESCRIPTION OF THE PREFERRED EMBODIMENT AND BEST MODE

Figure 1:
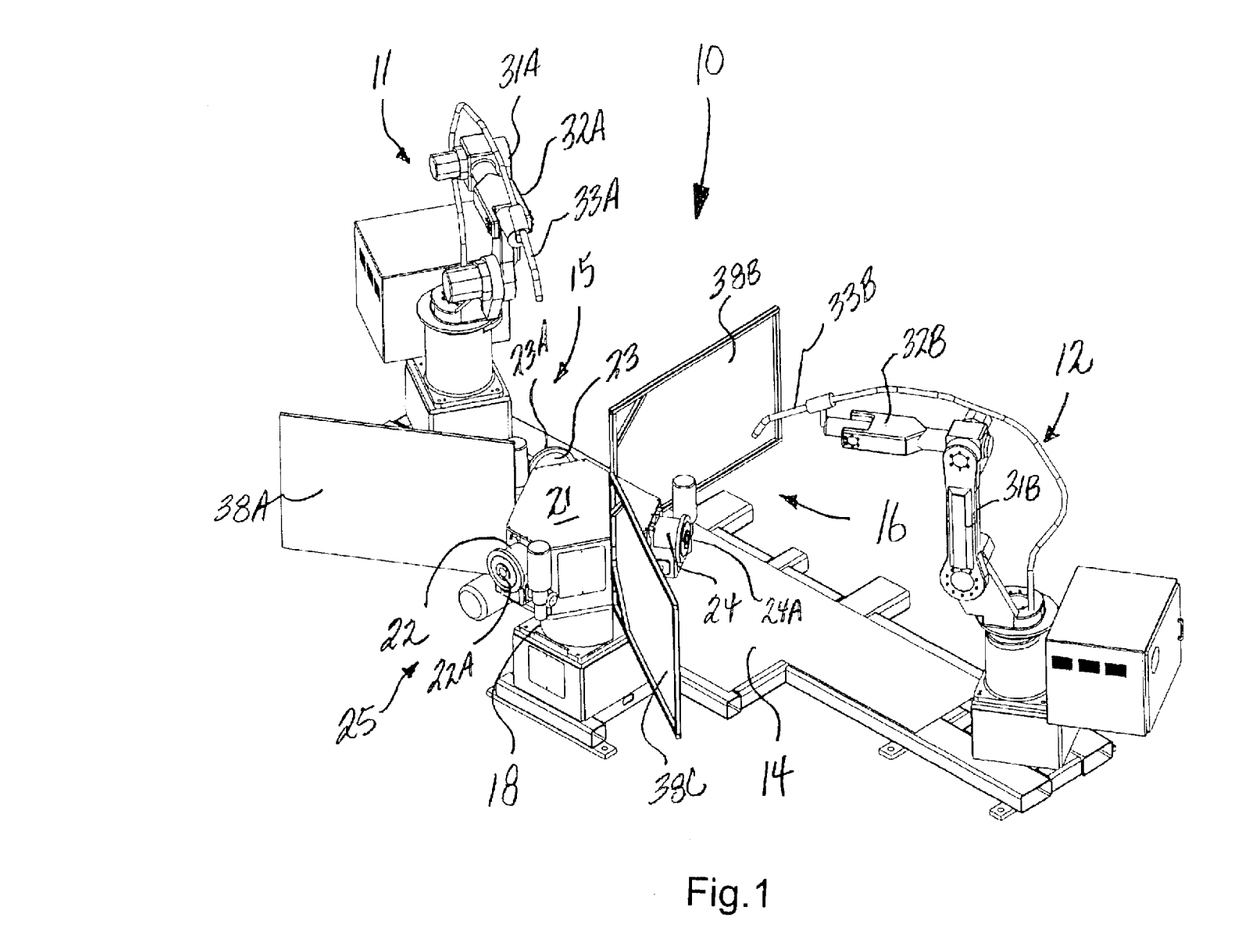
FIG. 1 is a perspective view of the multi-station robotic welding assembly according to one preferred embodiment of the invention, and showing the assembly with the fixtures and workpieces removed.
Figure 2:
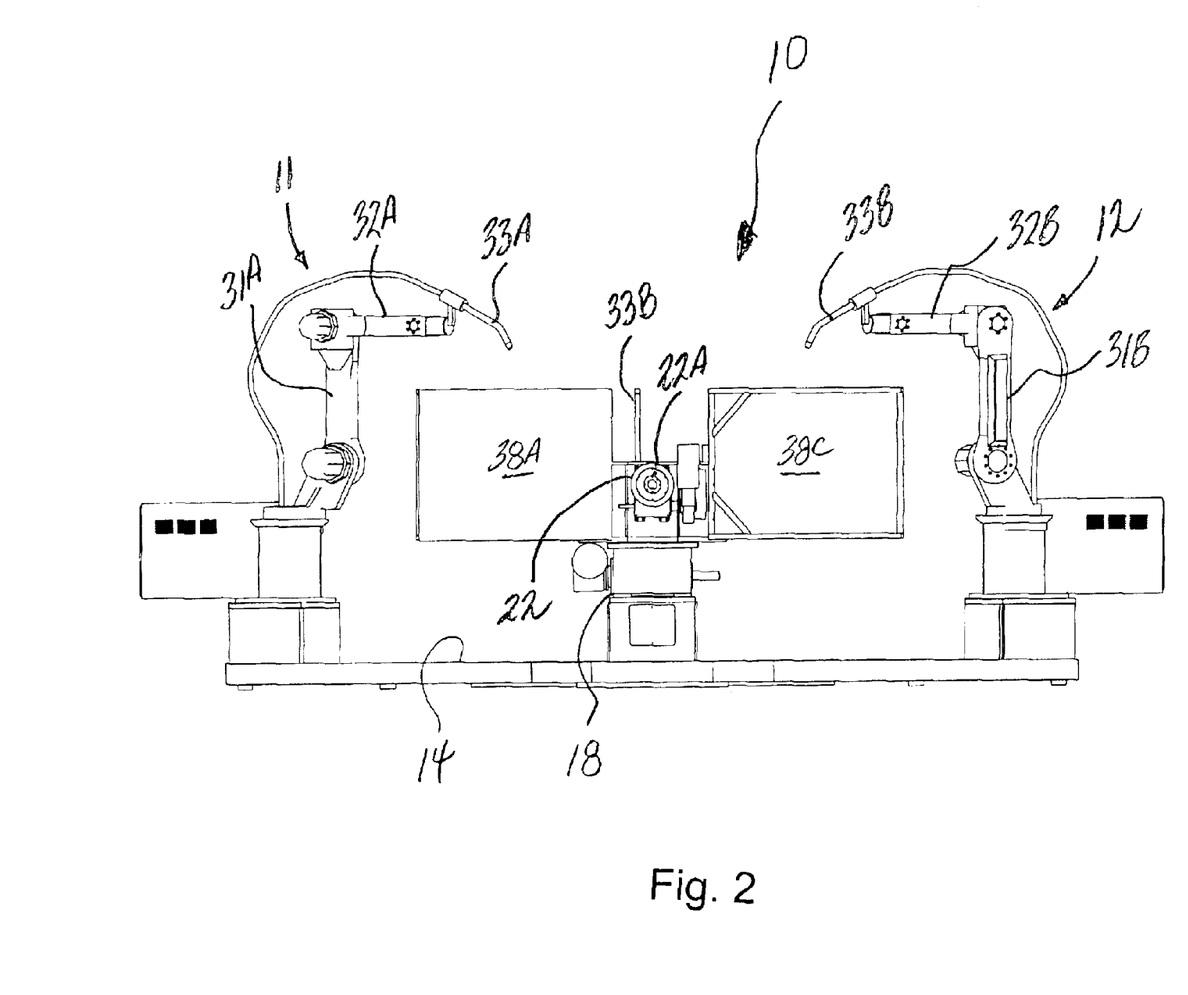
FIG. 2 is a front elevational view of the robotic welding assembly with the fixtures and workpieces removed.
Figure 3:
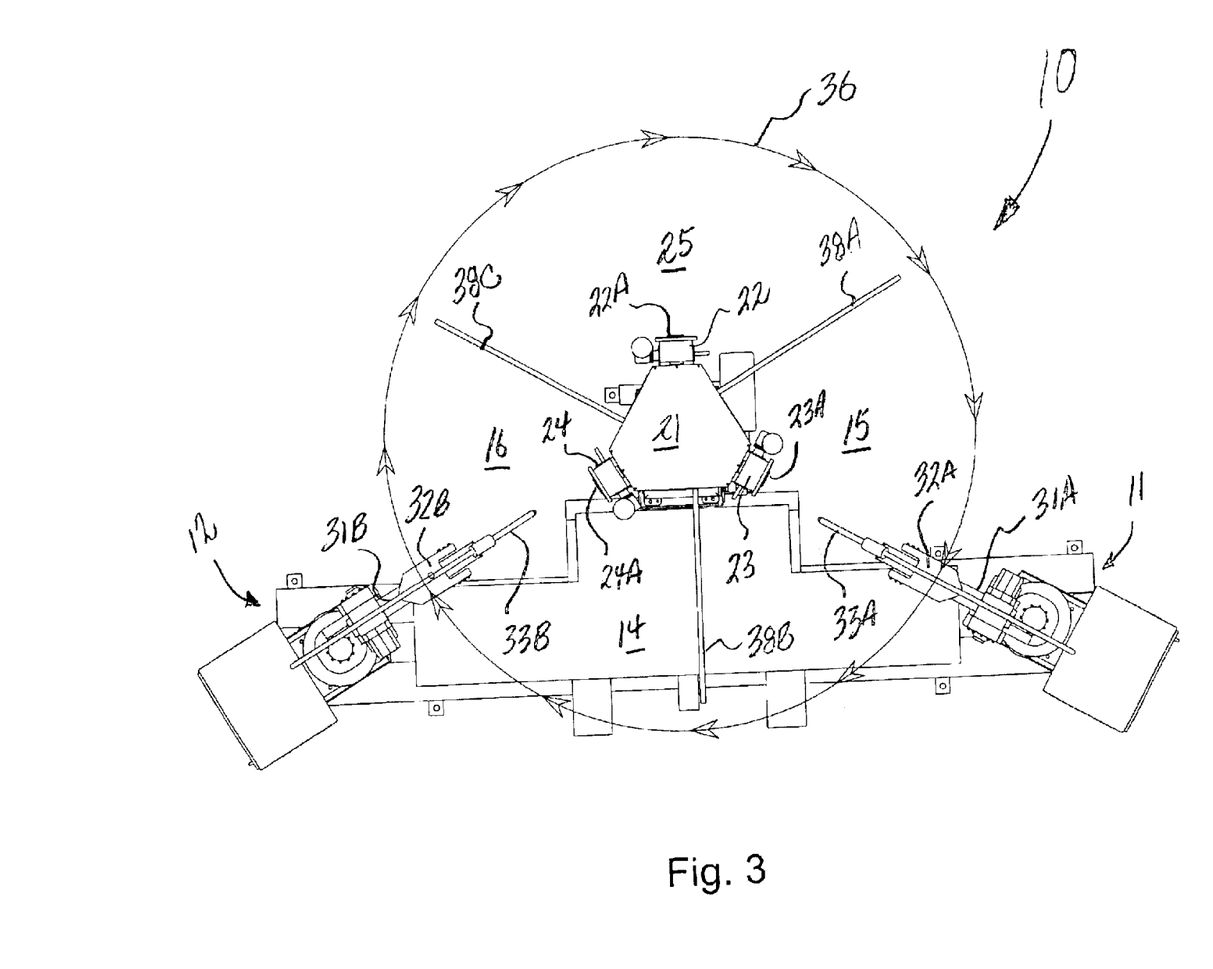
FIG. 3 is a top plan view of the robotic welding assembly with the fixtures and workpieces removed.

Referring now specifically to the drawings, a multi-station robotic welding assembly according to the present invention is illustrated in FIGS. 1–3, and shown generally at reference numeral 10. The assembly 10 is especially applicable in a production environment for welding items such as bumpers, foot plates, headlight supports, arm rests, and other components commonly used in all-terrain vehicles (ATVs) and golf carts. The assembly 10 includes first and second arc welding robots 11 and 12 attached to a common mounting platform 14 and located in respective weld stations 15 and 16. A rotatable fixture base 18 is mounted to the platform 14 between the robots 11, 12, and includes a junction box 21 and three indexers 22, 23, and 24 adapted for carrying respective fixtures used for holding workpieces to be welded. The fixtures "F" and "W" are illustrated in FIGS. 4–8, discussed below. Each fixture is custom designed and secured directly to a face plate 22A, 23B, and 24A of the indexer 22, 23, and 24 using a series of bolts and locating dowels. Individual components of the workpiece are loaded into the fixture at an operator's station 25 prior to welding, and are held in place by releasable clamps and holding devices. The mounting platform 14 provides a single common base for all components of the assembly 10, thus allowing convenient transport and relocation of the assembly without substantial disassembly or breaking down of parts.

Each of the robots 11 and 12 includes a movable arm 31A, 31B and wrist 32A, 32B adapted for carrying and manipulating a welding torch 33A, 33B. The robots 11, 12 are preferably manufactured by Fanuc Robotics of Rochester Hills, Mich., and sold under the trademark ARC Mate 100iB Robot. Each robot 11, 12 has a six-axis modular construction, and is electric servo driven for precision high-speed welding and cutting. The welding torch 33A, 33B is preferably a robotic, air-cooled MIG gun manufactured by Tregaskiss, Ltd. of Ontario, Canada, and sold as Model AC/QC 22° 4' 0.035".

The rotatable fixture base 18 includes a three-position, DC driven, rotary cam indexer, such as that manufactured by Commercial Cam Co., Inc. (CAMCO) of Wheeling, Ill., and sold as Model #1305. The indexer has a cam-driven index drive which provides repeated movement of the fixture base 18 from one position to another, as indicated by arrow 36 in FIG. 3, thereby rotating the fixtures and attached workpieces between each of the two weld stations 15, 16 and the operator station 25. Typical cam-driven index drives have two basic elements: a cam attached to the input shaft (camshaft) and a follower wheel attached to the output shaft. As the cam rotates, followers on the follower wheel are guided through a path dictated by the shape of the cam. During part of the input rotation, the cam confines the followers (and therefore, the output) to a rigid, stationary position called "dwell." During the remainder of the camshaft rotation, the cam geometry causes the followers to move and the output to rotate, or "index". As the camshaft is rotated at a constant velocity, the output stops and starts (dwells and indexes) in a repeating pattern.

The indexers 22, 23, and 24 mounted to the junction box 21 and carrying the fixtures are preferably eight-position, DC driven, rotary cam indexers, such as that manufactured by CAMCO and sold as Model #601. Each indexer 22–24 moves the fixture and attached workpiece between eight different positions during welding in each of the welding stations 15 and 16. The fixture indexers 22–24 are spaced 120 degrees apart, such that each indexer locates a fixture and workpiece in each of the two weld stations 15, 16 and the operator station 25. Protective shields 38A, 38B, and 38C are arranged between the weld stations 15, 16 and the operator station 25 for shielding and protecting the surrounding area during welding. The junction box 21 contains a precision, high-performance, electro-deposited D-ring, or slip ring (not shown), such as that manufactured by the Kaydon Corporation. The D-ring provides continuous electrical connection of the indexers to a main control panel. Unlike conventional indexers which rotate clockwise and counterclockwise in a 180-degree path, the present D-ring allows continuous 360-degree rotation of the base indexer 18, thereby avoiding winding and breakage of cables inside the junction box 21.

Each weld robot 11 and 12 has an individual ground cable. The ground cables are mounted to a brass block that is mounted to a dedicated pneumatic cylinder. After indexing to the respective station 15, 16, the ground changes are automated through the taught program. The grounds are pushed up against the outer surface of the face plates of the indexers 22, 23, and 24, and remain up until the welding is completed. After welding, the grounds are lowered out of the way, so that the next fixture can be indexed into the weld station 15, 16.

OPERATION OF THE ROBOTIC WELDING ASSEMBLY

Figure 4:
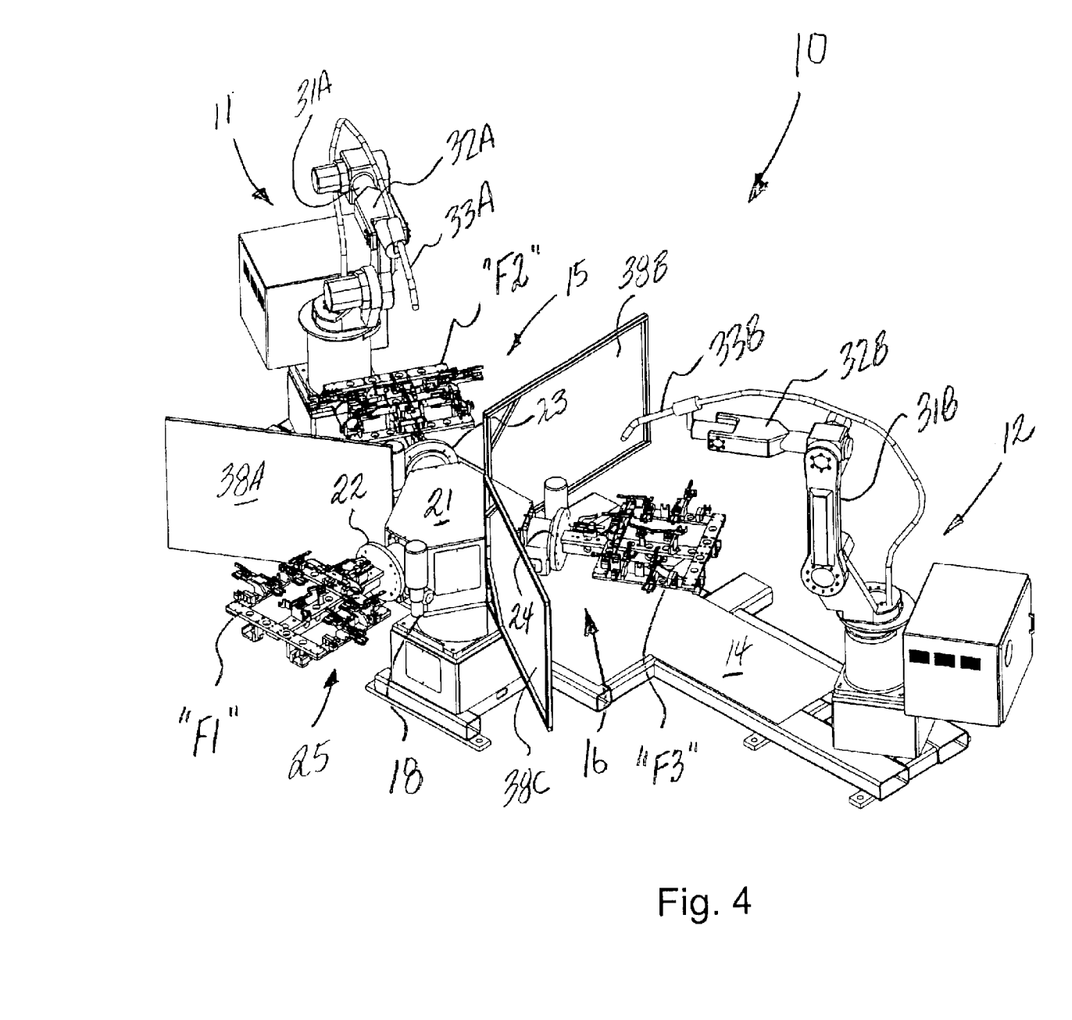
FIG. 4 is a perspective view of the robotic welding assembly with fixtures located at each of the operator and welding stations.

Referring to FIGS. 4–8, all stations of the robotic welding assembly 10 are initially empty prior to the operator's work shift. Customized fixtures "F" are mounted on respective indexers 22, 23, and 24 to accommodate the particular workpieces "W" to be welded, as shown in FIG. 4. Each indexer 22, 23, and 24 and fixture "F" cooperates to rotate the workpiece "W" between eight different positions during welding.

Figure 5:
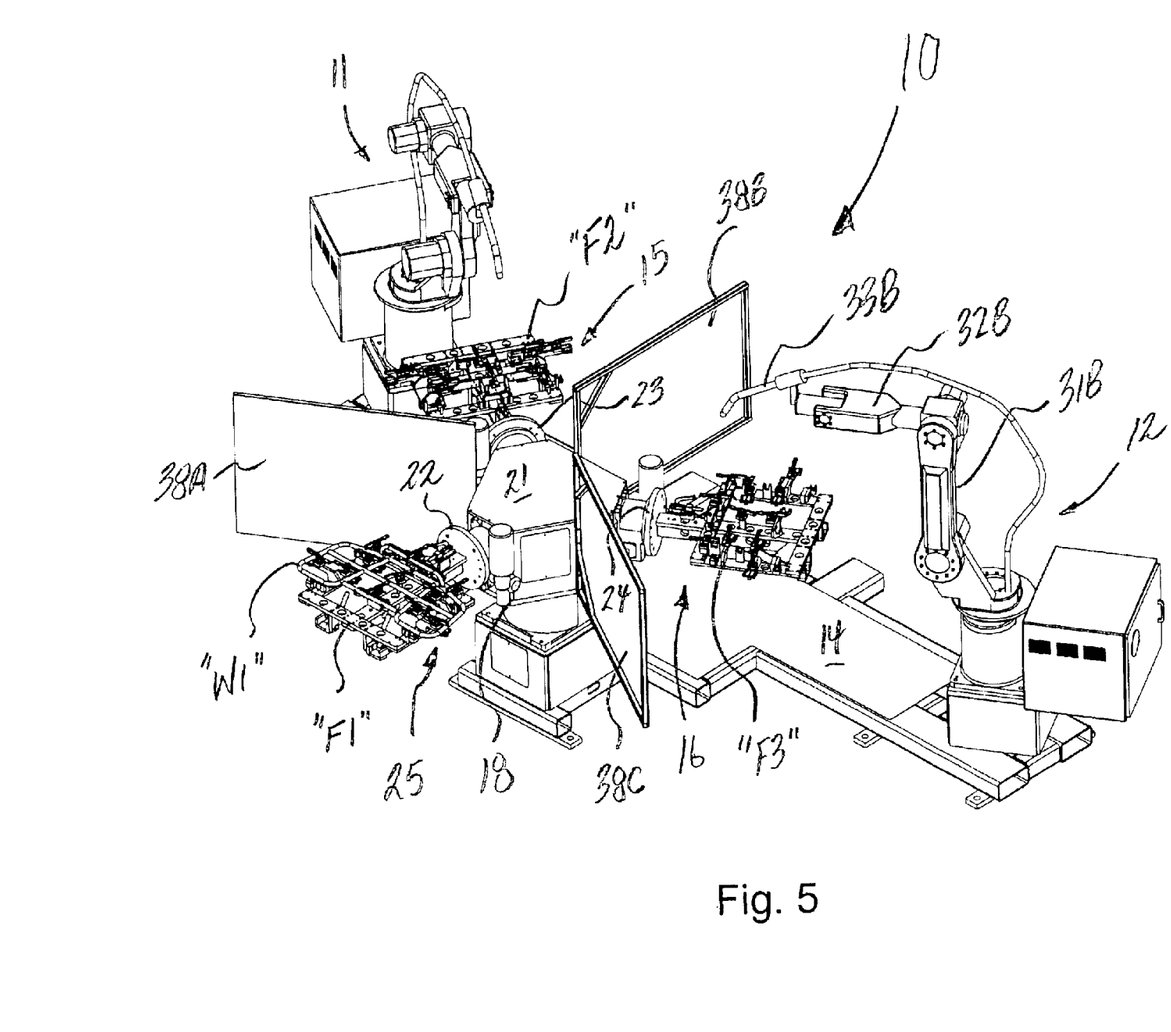
FIG. 5 is a perspective view of the robotic welding assembly, and showing a workpiece loaded in the fixture at the operator station.
Figure 6:
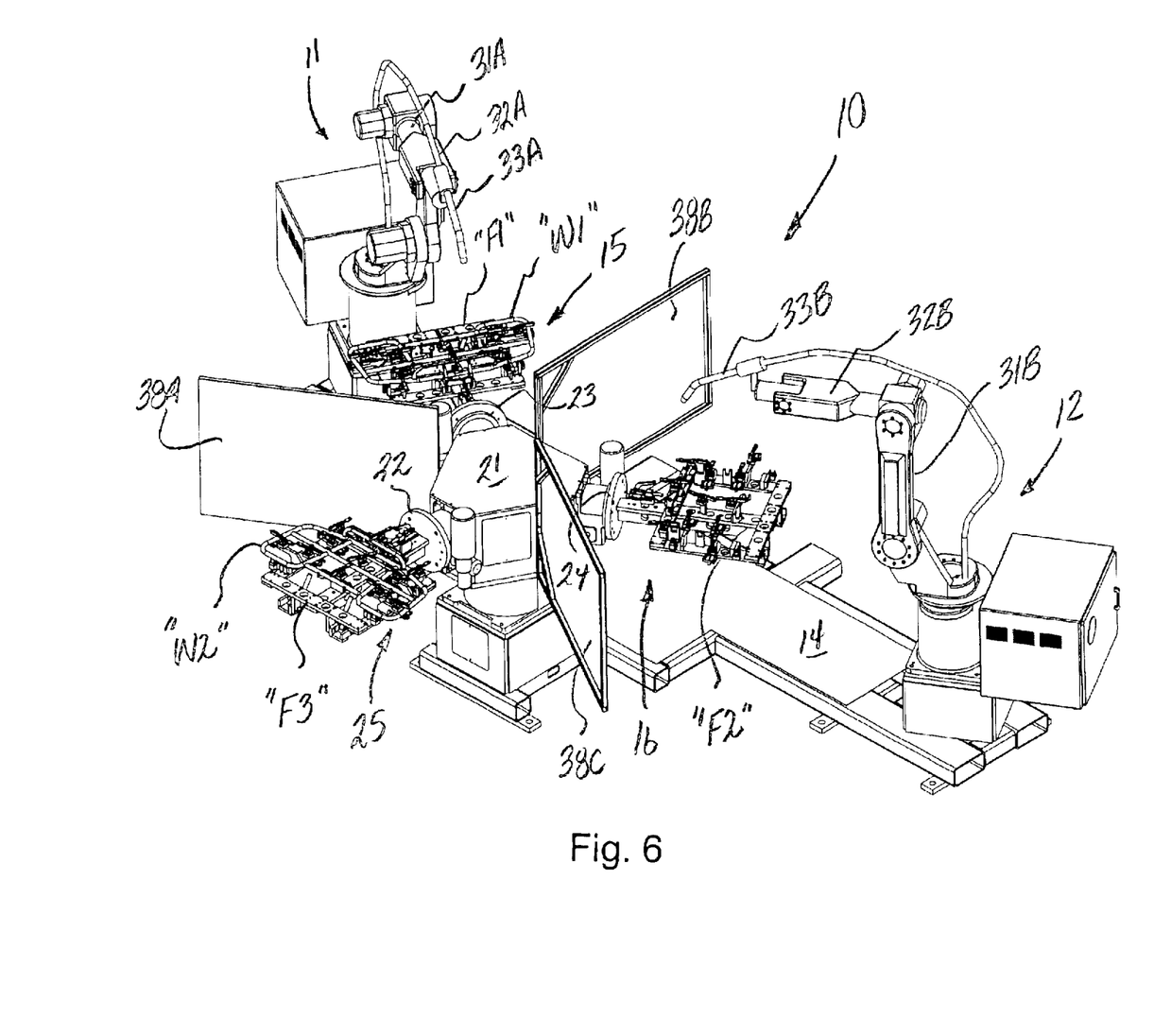
FIG. 6 is a perspective view of the robotic welding assembly, and showing workpieces loaded in the fixtures at the operator station and the first welding station, respectively.
Figure 7:
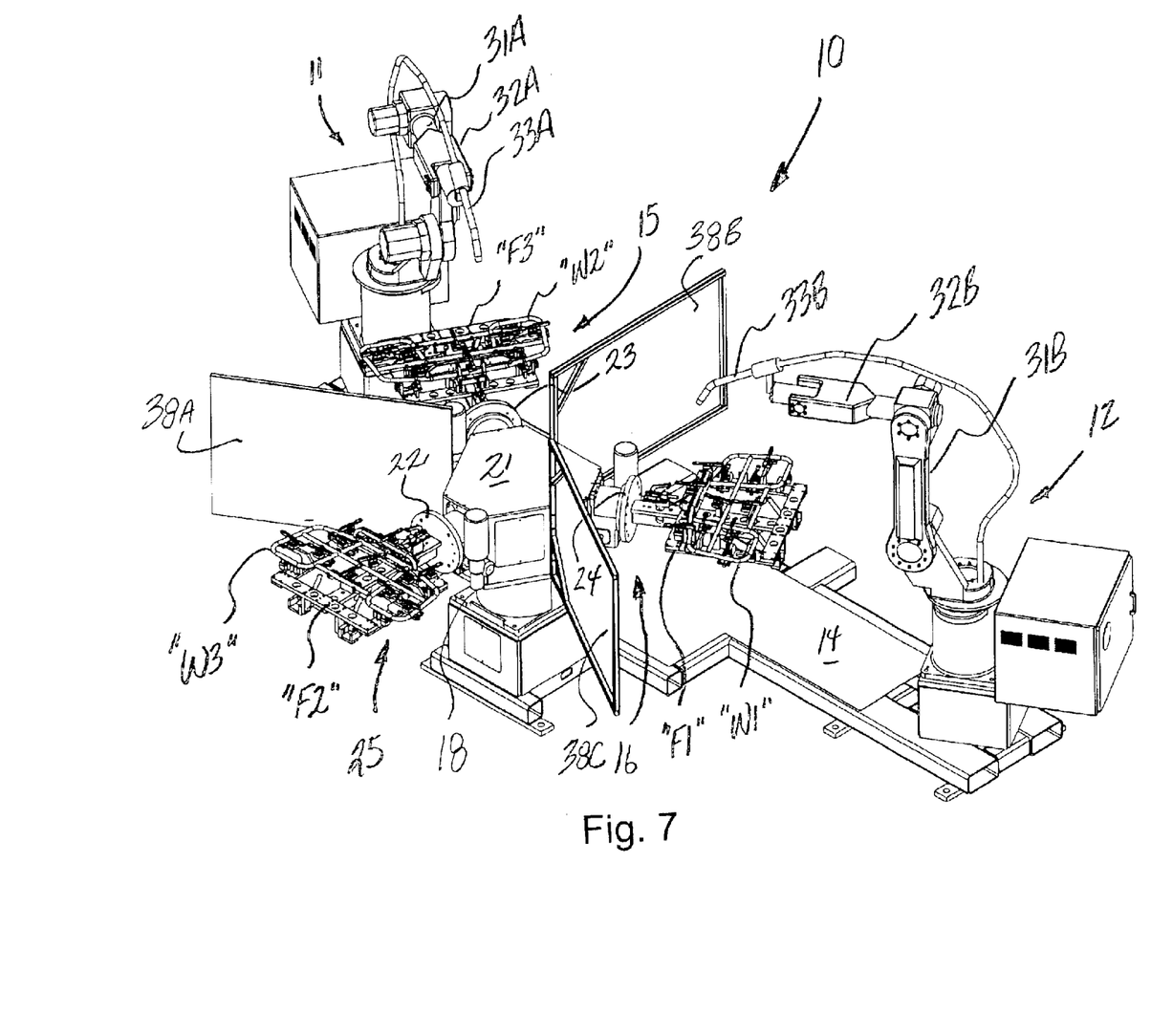
FIG. 7 is a perspective view of the robotic welding assembly, and showing workpieces loaded in the fixtures at the operator station, the first welding station, and the second welding station, respectively.
Figure 8:
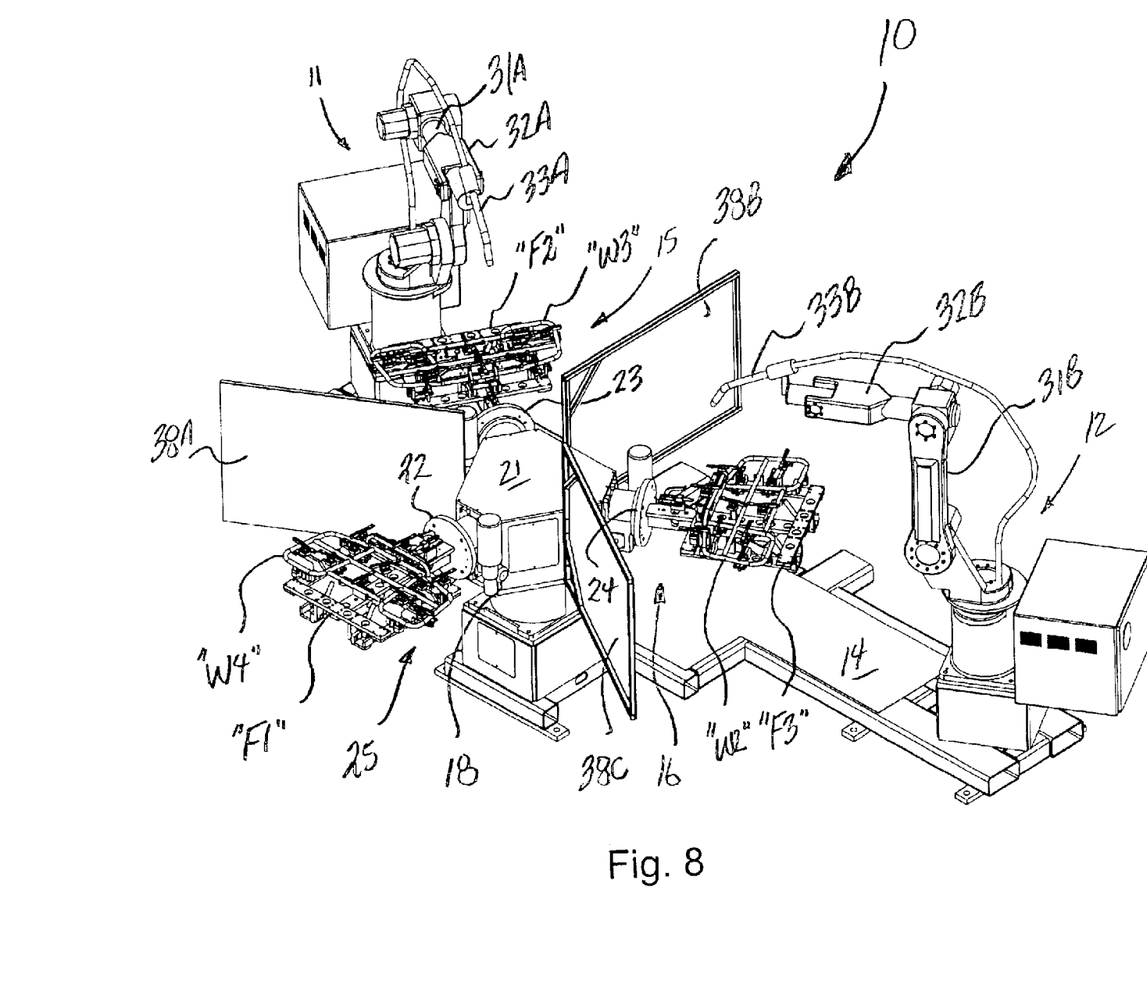
FIG. 8 is a perspective view of the robotic welding assembly, and showing workpieces loaded in the fixtures at the operator station, the first welding station, and the second welding station, respectively, after a completed welding cycle.

To begin the welding process, the operator activates the arc welding robots 11 and 12 located in the weld stations 15 and 16, respectively, and verifies the system programming applicable for the present shift. Programming for the robots 11, 12 is initiated to place the system in a complete automatic mode. The operator begins the shift by loading a first workpiece "W1" into the fixture "F1" at the operator station 25, as shown in FIG. 5. Once this fixture "F1" is loaded, the system program is initiated at a control panel. The fixture base 18 indexes approximately 120 degrees to move the first loaded workpiece "W1" directly in front of the robot 11 in the first weld station 15 for welding, as shown in FIG. 6. This action simultaneously moves the second fixture "F2" directly in front of the robot 12 in wait in the second weld station 16, and the fixture "F3" into the operator station 25 for loading. While robot 11 welds 50% of the workpiece "W1" in the first weld station 15, the operator loads a second workpiece "W2" into the fixture "F3". When robot 11 has completed welding at the first weld station 15, the fixture base 18 indexes to simultaneously move the second workpiece "W2" in front of robot 11 in the first weld station 15, the first workpiece "W1" in front of robot 12 in the second weld station 16, and fixture "F2" to the operator station 25 for loading. In the position shown in FIG. 7, the robot 11 welds 50% of the second workpiece "W2" in the first weld station 11, while robot 12 completes welding of the first workpiece "W1" in second weld station 16. At the same time, the operator loads a third workpiece "W3" into the fixture "F2" at the operator station 25. After welding is completed in both of the weld stations 15 and 16, the fixture base 18 indexes to simultaneously move the third workpiece "W3" in front of robot 11 in the first weld station 15, the second workpiece "W2" in front of robot 12 in the second weld station 16, and the first workpiece "W1" to the operator station 25 for unloading. In the position shown in FIG. 8, the operator unloads a completely assembled, welded workpiece "W1" from the fixture "F1" at the operator station 25, and then reloads the fixture "F1" with a fourth workpiece "W4". At the same time, robot 11 welds 50% of the third workpiece "W3" at the first weld station 15, while robot 12 completes welding of the second workpiece "W2" in the second weld station 16. This cycle continues for the remainder of the shift.

The above process maximizes operator production and efficiency by utilizing welding time to load and unload the fixtures "F" in the operator station 25. Moreover, the use of multiple robots substantially reduces the weld cycle time without requiring additional man power. With two robots 11, 12 welding 50% of the same workpiece "W", as described above, welding is completed 50% faster and at half the labor cost. The present assembly 10 requires less floor space than a standard two-robot weld cell; the required floor space being generally the same as that of a single robot cell.

A multi-station robotic welding assembly is described above. Various details of the invention may be changed without departing from its scope. Furthermore, the foregoing description of the preferred embodiment of the invention and best mode for practicing the invention are provided for the purpose of illustration only and not for the purpose of limitation—the invention being defined by the claims.

What is claimed is:

1. A multi-station robotic welding assembly, comprising:
   (a) a mounting platform;
   (b) a plurality of robots attached to said mounting platform and located in respective weld stations, each of said robots comprising an elongated movable arm and wrist;
   (c) a welding torch attached to each of said robots and adapted for being manipulated by said movable arm and wrist;
   (d) a rotatable fixture base located on said mounting platform and adapted for supporting a plurality of fixtures, each of the fixtures adapted for holding and positioning a workpiece for welding in respective weld stations, wherein said fixture base comprises a junction box containing an electrical D-ring connector adapted for enabling continuous 360 degree rotation of said fixture base; and
   (e) a base indexer adapted for repeatedly rotating said fixture base by a predetermined degree, such that the fixtures are positioned within respective weld stations for an index interval sufficient to complete welding of the workpieces.

2. A multi-station robotic welding assembly according to claim 1, wherein said fixture base comprises a plurality of fixture indexers adapted for carrying respective fixtures, and for repeatedly rotating the fixtures and workpieces in respective weld stations by a predetermined degree during welding.

3. A multi-station robotic welding assembly according to claim 2, wherein each fixture indexer comprises eight discrete positions.

4. A multi-station robotic welding assembly according to claim 2, wherein said fixture Indexers are spaced 120 degrees apart.

5. A multi-station robotic welding assembly according to claim 1, and comprising a station shield located between each of said weld stations for shielding and protecting a surrounding area during welding.

6. A multi-station robotic welding assembly according to claim 1, wherein said plurality of industrial robots comprises two robots located in respective first and second weld stations.

7. A multi-station robotic welding assembly according to claim 6, and comprising an operator station located between said first and second weld stations for loading and unloading the workpieces.

8. A multi-station robotic welding assembly, comprising:
   (a) a mounting platform;
   (b) a plurality of robots attached to said mounting platform and located in respective weld stations, each of said robots comprising an elongated movable arm and wrist;

(c) a welding torch attached to each of said robots and adapted for being manipulated by said movable arm end wrist;

(d) a rotatable fixture base located on said mounting platform, wherein said fixture base comprises a junction box containing an electrical D-ring connector adapted for enabling continuous 360 degree rotation of said fixture base;

(e) a plurality of fixtures supported on said fixture base, each of said fixtures adapted for holding and positioning a workpiece for welding in respective weld stations; and (f) a base indexer adapted for repeatedly rotating said fixture base by a predetermined degree, such that said fixtures are positioned within respective weld stations for an index interval sufficient to complete welding of the workpieces.

9. A multi-station robotic welding assembly according to claim 8, wherein said fixture base comprises a plurality of fixture indexers adapted for carrying respective fixtures, and for repeatedly rotating the fixtures and workpieces in respective weld stations by a predetermined degree during welding.

10. A multi-station robotic welding assembly according to claim 9, wherein each fixture indexer comprises eight discrete positions.

11. A multi-station robotic welding assembly according to claim 9, wherein said fixture indexers are spaced 120 degrees apart.

12. A multi-station robotic welding assembly according to claim 9, wherein said plurality of industrial robots comprises two robots located in respective first and second weld stations.

13. A multi-station robotic welding assembly according to claim 12, and comprising an operator station located between said first and second weld stations for loading and unloading the workpieces.

14. A multi-station robotic welding assembly according to claim 8, and comprising a station shield located between each of said weld stations for shielding and protecting a surrounding area during welding.

15. A multi-station robotic welding assembly, comprising:

(a) a plurality of robots mounted on a supporting surface and located in respective weld stations, each of said robots comprising an elongated movable arm and wrist;

(b) a welding torch attached to each of said robots and adapted for being manipulated by said movable arm and wrist;

(c) a rotatable fixture base adapted for supporting a plurality of fixtures, each of the fixtures adapted for holding and positioning a workpiece for welding in respective weld stations, wherein said fixture base comprises a junction box containing an electrical D-ring connector adapted for enabling continuous 360 degree rotation of said fixture base; and (d) a base indexer adapted for repeatedly rotating said fixture base by a predetermined degree, such that the fixtures are positioned within respective weld stations for an index interval sufficient to complete welding of the workpieces.

16. A method for welding a workpiece comprising the steps of:

(a) loading a first workpieces into a first fixture located in an operator's station;

(b) indexing the first fixture to locate the first workpiece in a first weld station;

(c) welding a first portion of the first workpiece in the first weld station;

(d) during the welding process of step (c), loading a second workpiece into a second fixture located n the operators station;

(e) indexing the first and second fixtures to locate the first and second workpieces in respective second and first weld stations;

(f) welding a first portion of the second workpiece in the first weld station while simultaneously welding a second portion of the first workpiece in the second weld station;

(g) during the welding process of step (f), loading a third workpiece into a third fixture located in the operators station;

(h) indexing the first, second, and third fixtures to locate the first, second, and third workpieces in the operator's station, the second weld station, and the first weld station, respectively;

(i) welding a first portion of the third workpiece in the first weld station while simultaneously welding a second portion of the second workpiece in the second weld station; and (j) during the welding process of step (i), removing the first workpiece from the first fixture in the operator's station.

* * * * *

UNITED STATES PATENT AND TRADEMARK OFFICE
CERTIFICATE OF CORRECTION

PATENT NO.   : 6,907,318 B2
DATED        : June 14, 2005
INVENTOR(S)  : Passmore et al.

It is certified that error appears in the above-identified patent and that said Letters Patent is hereby corrected as shown below:

Column 6,
Line 48, "Indexers" should be deleted and -- indexers -- added.

Column 7,
Line 3, "end" should be deleted and -- and -- added.

Column 8,
Line 16, "workpieces" should be deleted and -- workpiece -- added.
Line 24, "n" should be deleted and -- in -- added.
Line 34, "operators" should be deleted and -- operator's -- added.

Signed and Sealed this

Twenty-ninth Day of November, 2005

JON W. DUDAS
*Director of the United States Patent and Trademark Office*